Jan. 24, 1956  L. E. LAUX  2,731,712
POSITIONING TOOL FOR ESTABLISHING WORKING SURFACES
Filed May 2, 1950  4 Sheets-Sheet 1

INVENTOR
LEON E. LAUX,

BY
ATTORNEY

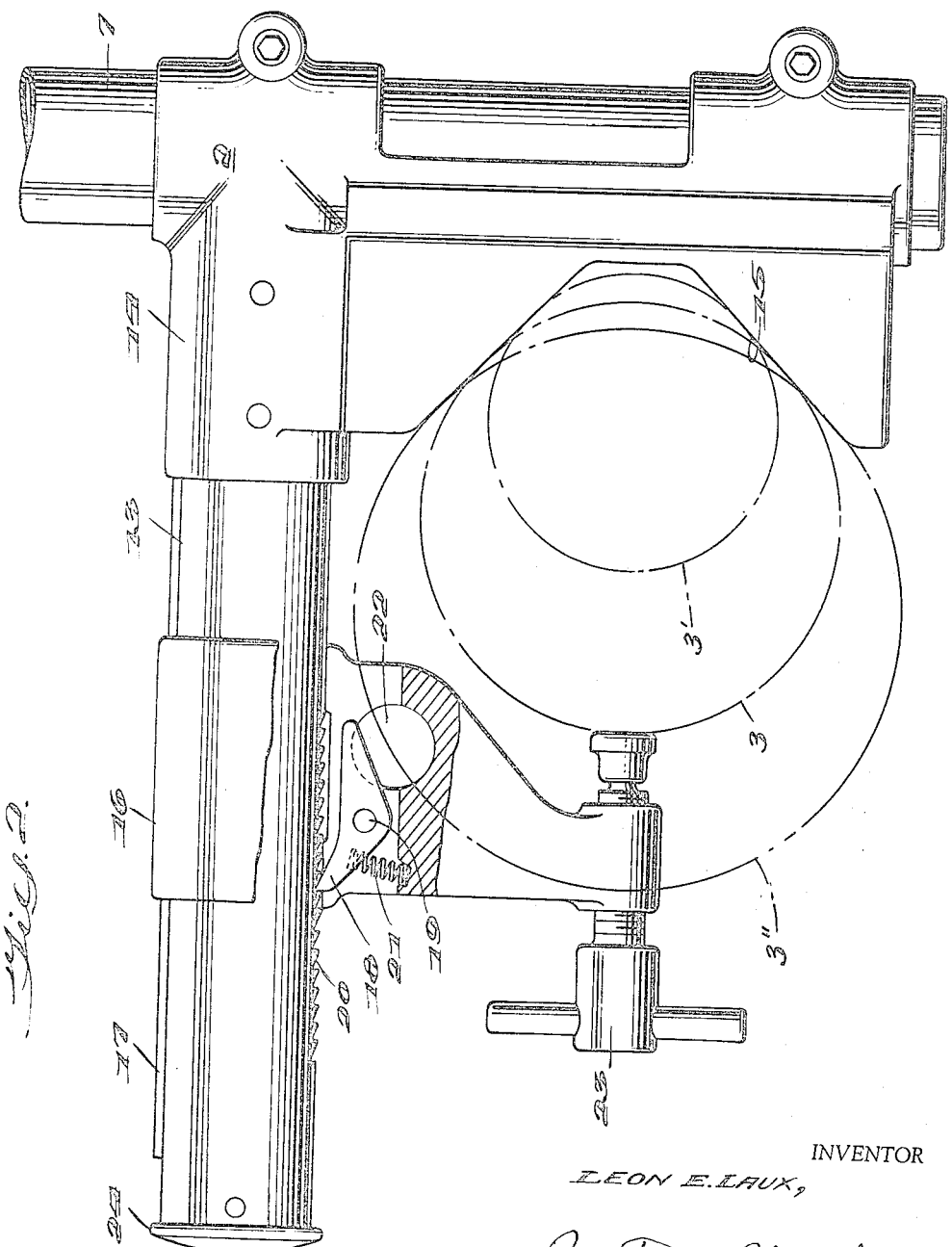

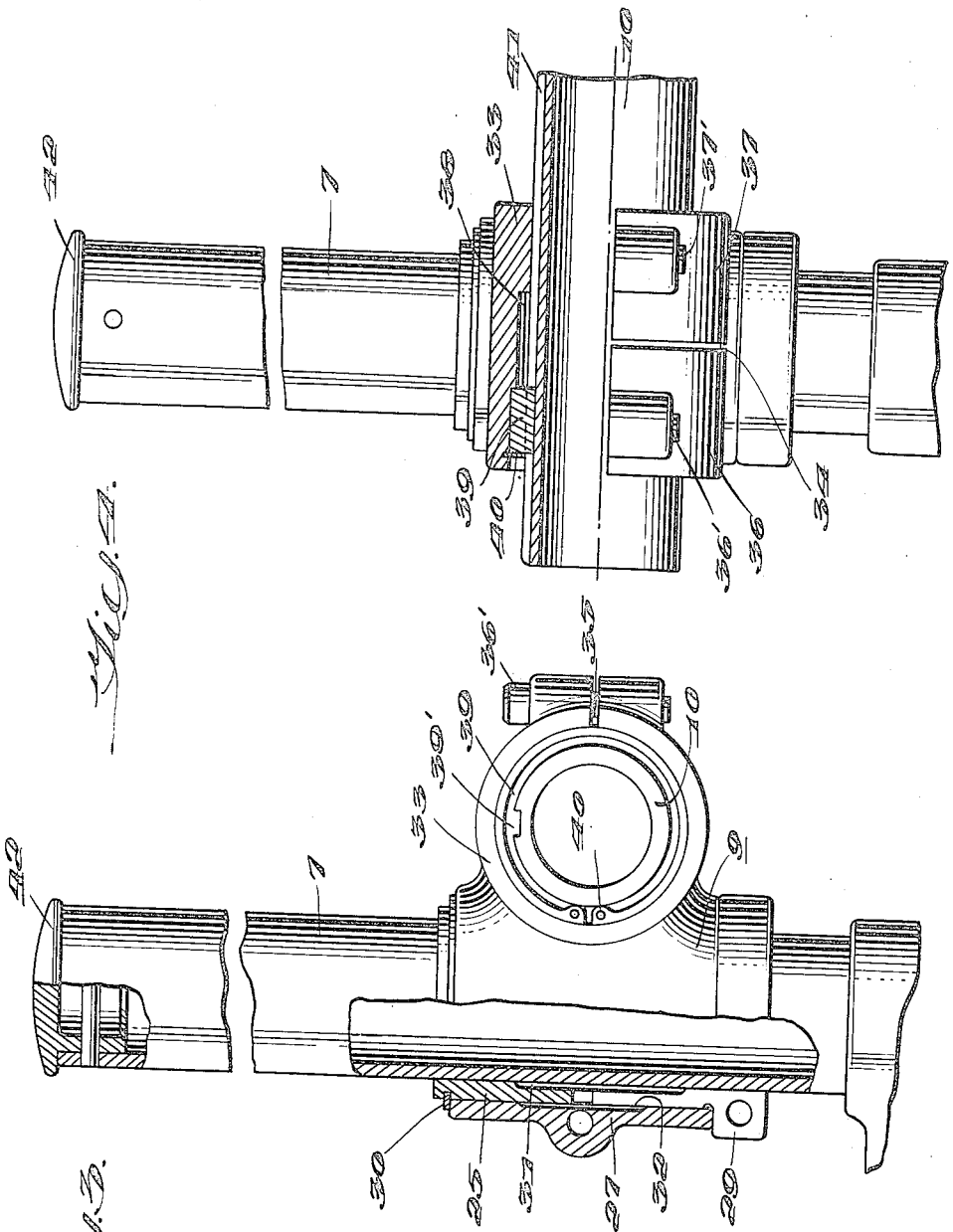

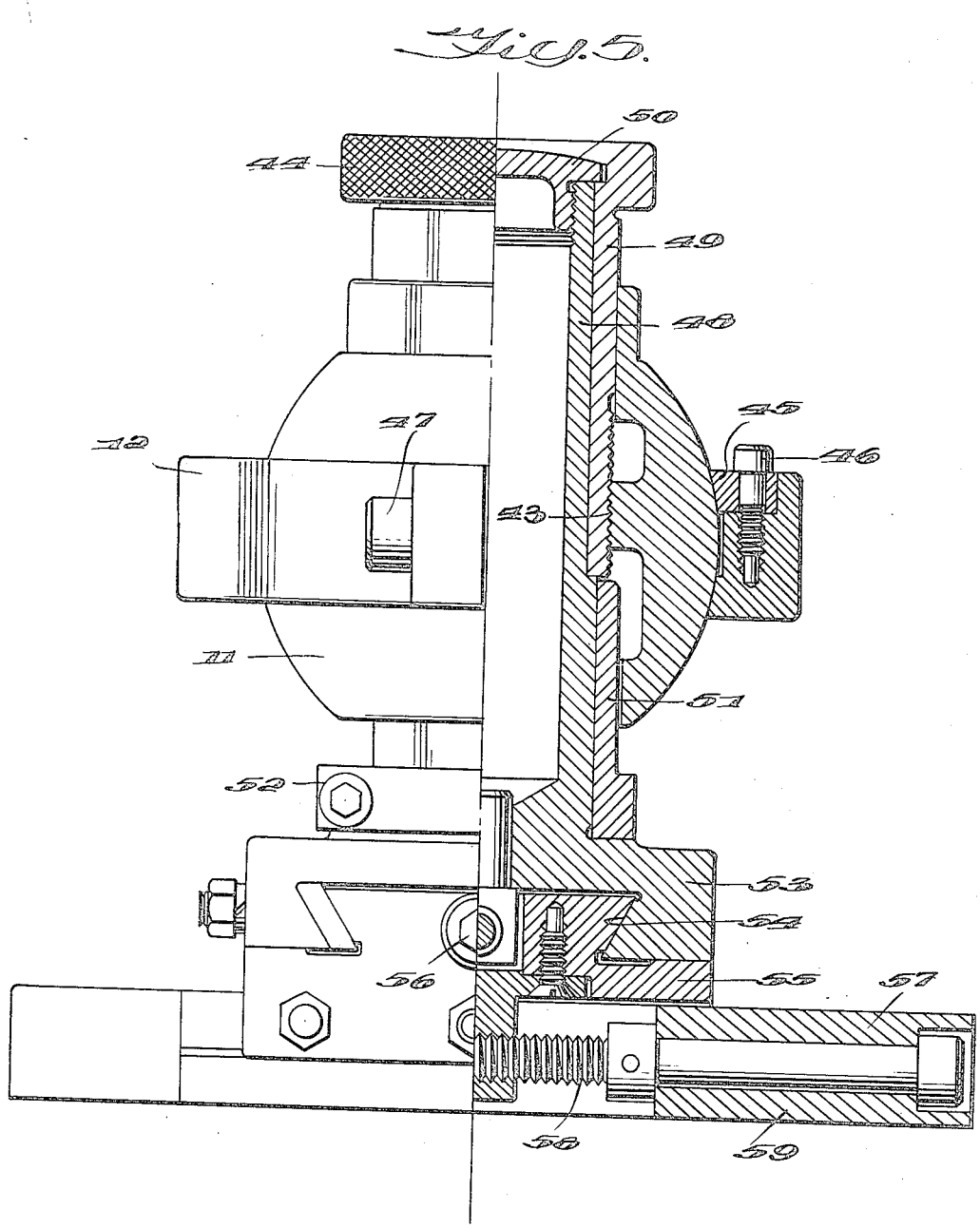

United States Patent Office 2,731,712
Patented Jan. 24, 1956

2,731,712

POSITIONING TOOL FOR ESTABLISHING WORKING SURFACES

Leon E. Laux, Baltimore, Md., assignor to The Glenn L. Martin Company, Middle River, Md., a corporation of Maryland Application May 2, 1950, Serial No. 159,482

6 Claims. (Cl. 29—284)

This invention relates to a method for locating working surfaces on jigs and fixtures and more particularly to a positioning tool used in conjunction therewith.

Large, complex structures such as airplane fuselages are constructed from numerous small parts and sub-assemblies. These parts and sub-assemblies must all be accurately fitted together to form the finished product. To facilitate this system of making such structures, jigs and fixtures are employed which support those sections while they are assembled. The proper alignment of those parts and sub-assemblies obviously depend upon the accuracy of the jig or fixture to which they are attached.

The existing methods of establishing finished working surfaces on jigs and fixtures, for aligning the various parts or sub-assemblies, are very costly because of the amount of machine work and set-up time required. These existing methods involve locating a plate in the proper position with respect to the jig, by machining or by "jacking" with hand adjusted set screws, prior to securing it to the jig or fixture base with bolts and dowels. The accuracy which must accompany this tooling operation makes it a very tedious job in view of the crude methods now known. After the plates have been established as finished working surfaces, additional time is necessary for close tolerance machining of special locators which, for certain applications, must be attached to the working surface to properly position the assemblies. The bolts and dowels tend to permit misalignment, making it necessary to frequently check the working surfaces for any movement. This laborious tooling procedure accounts for a large percentage of the cost of any article requiring the use of jigs and fixtures in the course of its manufacture. This is especially apparent when only a few items are to be produced such as is frequently the case in airframe production.

An object of this invention is to provide a positioning tool, the use of which will substantially eliminate machining and reduce costs in assembly tooling.

Another object of this invention is to provide an adjustable positioning tool for locating working surfaces on a jig or fixture which will permit standardization of the basic design features of jigs and fixtures so as to permit stock piling of those parts for future assembly in accordance with the specific application. This will considerably reduce tooling time and distribute the work load. Since time is quite frequently of utmost importance in assembly tooling, the savings which may be realized by use of this invention are especially appreciated.

Another object of this invention is to provide a positioning tool which is to be used in conjunction with a new method of accurately setting finished working surfaces and details on jigs and fixtures which will reduce both labor and material costs considerably.

Still another object of this invention is to provide a portable positioning tool which is simple to operate and which is sufficiently adjustable that it can be used in conjunction with virtually any size jig or fixture.

Further and other objects will become apparent from the accompanying description and drawings which form a part of this disclosure and in which like numerals refer to like parts.

In the drawing:

Figure 2 shows the detail construction of the clamping means with a cut-away view of the quick release mechanism.

Figures 3 and 4 show the construction details of the cross-head in fragmentary sectional views.

Figure 5 is a view of the compound swivel showing a portion thereof in section.

Figure 1:
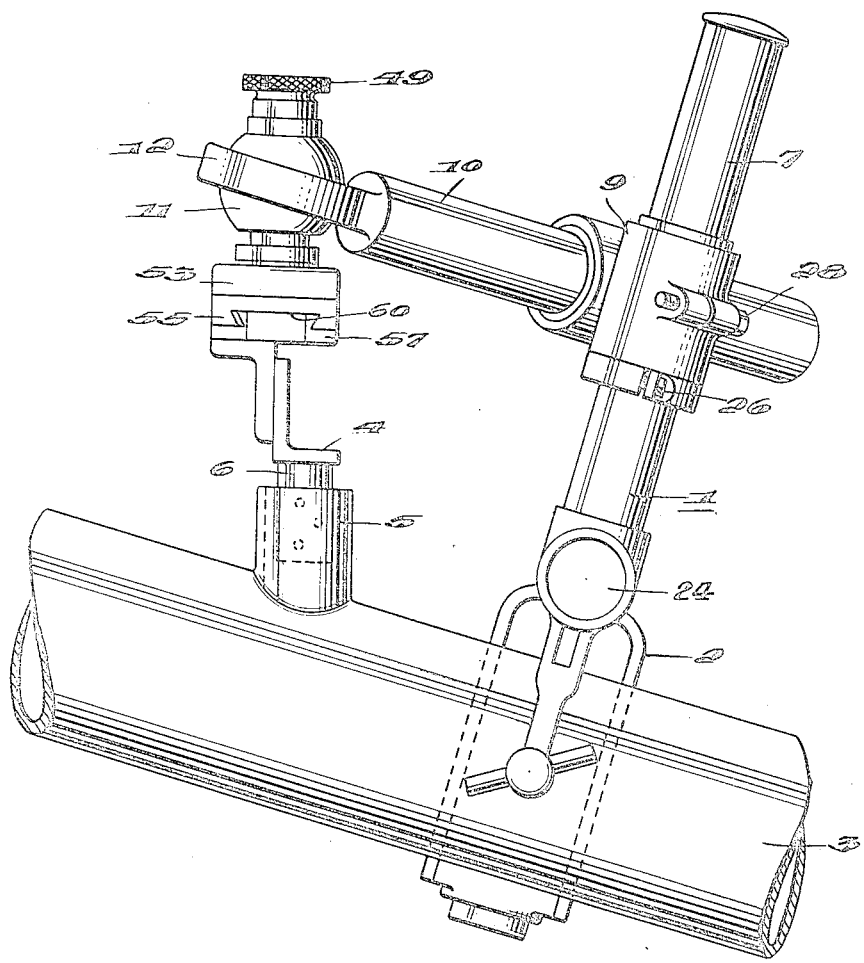
Figure 1 shows the positioning tool clamped to a jig, positioning a working surface by the method disclosed.

Positioning tool 1, as described hereinbelow, is provided with a quick release clamp 2 for holding it in position on jig 3 as shown in Figure 1. The tool further includes the main support 7, formed as a rigid extension on clamp 2, which slidably engages cross-head 9 which, in turn, is independently movable rotationally and axially with respect to the support. Arm 10 of tool 1 engages cross-head 9, and is also independently movable axially and rotationally. At one end of arm 10, a generally spherical ball forming a universal swivel element 11 is mounted in a swivel ring 12, formed as an extension of arm 10. Universal swivel element 11 carries the fine adjustment means which accurately locates working surface 4. Working surface 4 is provided with a projection or extension so that after alignment it may be secured to cup 5 on jig 3 as hereinafter described.

Clamp 2 on tool 1, is carried by main support 7 and is readily adaptable to almost any size jig or fixture. As most clearly shown in Figure 2, a clamp arm 13 extends generally radially from main support 7 and is held in fixed position by bracket 14. A wedge shaped seat 15, formed on bracket 14, is adapted to seat jig or fixture frames of various sizes indicated by numerals 3, 3' and 3". The quick release member 16 circumferentially engages clamp arm 13 and is held from rotating therearound by key 17 extending axially along arm 13. Latch 18, pivotally held by pin 19 on member 16, engages one of the plurality of notches 20 cut in arm 13 to approximately position member 16 and adapt the clamp to a particular jig or fixture. Spring 21 tends to maintain latch 18 in engagement with one of the notches 20, and may be released by overcoming the spring tension with a force applied through finger opening 22. This provides a quick method of removing the positioning tool from the jig or fixture. A hand operated screw jack 23, included as a part of clamp 2, provides the final adjustment necessary for the clamp to securely grip a jig or fixture frame. Cap 24, fitted on the end of clamp arm 13, provides a stop for sleeve 16 and strengthens the hollow tube.

Cross-head 9 on tool 1 is slidably carried by main support 7 as most clearly shown in Figure 3. Inner sleeve 25 controls the axial movement of cross-head 9 on support 7 and is split axially along the wall so as to be deflected by a clamp screw 26 shown in Figure 1, when the clamp is tightened. This reduces the diameter of sleeve 25 and thereby grips main support 7 to prevent axial movement when desired. Outer sleeve 27 is carried by inner sleeve 25 to provide rotational movement of the cross-head about support 7. A flange 29 on one end of inner sleeve 25 and a retaining ring 30 on the other end hold outer sleeve 27 in proper axial position with respect to the inner sleeve. A clamp screw 28, shown in Figure 1, on outer sleeve 27, which also is split axially along one wall, causes the outer sleeve to squeeze tightly against inner sleeve 25 and thus prevent its rotation. Both sleeves have recesses 31 and 32 cut therein on the inside surfaces to reduce frictional drag.

Outer sleeve 27 has a collar 33 formed integral therewith having its axis offset and disposed substantially 90° from the axis of main support 7. The angular displacement may, of course, be other than 90°, if deemed desirable. Collar 33 is slotted at 34 in a plane generally normal to its axis to provide two independent clamping portions 36 and 37. To provide clamping action, collar 33 is slotted at 35 axially along a wall. Clamp screws 36' and 37' then may deflect their portion of the collar to control the diameter of the opening. Collar 33 has a recess 38 extending circumferentially around its inner surface. Recess 38 is enlarged on one portion of collar 33 to receive inner keyed sleeve 39. Sleeve 39 may be rotated in collar 33 when screw 36' is loosened but is held against rotation when screw 36' is tightened. Keyed sleeve 39 is held in its desired axial position by inside retainer ring 40. Arm 10 extends through collar 33 and sleeve 39. Keyway 41 in arm 10 engages the key 39' on sleeve 39 to prevent rotation of arm 10 when screw 36' is drawn tight. Axial movement of arm 10 is controlled by screw 37' on portion 37 of collar 33. This allows independent axial and rotational movement of arm 10 to more quickly position working surface 4. Cap 42 on main support 7 provides a limit stop for cross-head 9.

Swivel ring 12, connected to arm 10 as shown in Figure 1, supports the generally spherical universal swivel element 11. As shown in Figure 5, swivel ring 12 is made in parts whereby portion 45 may be removed to seat universal swivel element 11 into swivel ring 12 by simply loosening screws 46. Ring 12 is discontinuous between the ends of clamping screw 47 to provide space for its deflection. The tolerance between swivel ring 12 and swivel element 11 is such that by tightening clamping screw 47, the ring is deflected sufficiently to tightly grip swivel element 11, and prevent its universal movement.

Universal swivel element 11 carries the cross-slide arrangement and the fine adjustment means associated therewith as described below. Swivel element 11 has a cylindrical bore drilled therethrough for accepting adjusting sleeve 49 and movable post 48. Threads on the exterior surface of adjusting sleeve 49 engage mating threads 43 in universal swivel element 11 so that rotation of sleeve 49 by a tortional force applied on knurled knob 44, causes axial movement thereof to raise or lower post 48. Post 48 extends through the hollow tubular portion of sleeve 49 and is threaded on its inside surface adjacent the end for engaging retaining cap 50. Cap 50 and post 48 are flanged so as to engage the ends of sleeve 49 and prevent relative axial movement therebetween while permitting relative rotation thereof. Universal swivel element 11 is provided with a keyway which engages key 51 formed integral with rotation clamp 52 to prevent post 48 from rotating when clamp 52 is drawn tightly against the outer wall thereof. Key 51 is confined in the upward direction by adjusting sleeve 49, and this arrangement aids in the proper positioning of rotation clamp 52 and the maintaining of a fixed axial relationship with respect to post 48 at all times. Head 53, formed on post 48 adjacent clamp 52, has slide-way 54 formed therein transversely of post 48 for engaging intermediate cross-slide 55. The movement of intermediate cross-slide 55 in slide-way 54 is controlled by lead screw 56. A cross-slide 57 engages slide-way 60 in intermediate cross-slide 55 as shown in Figure 1. The movement of cross-slide 57 is substantially normal to and in a plane substantially parallel with the movement of intermediate cross-slide 55. Lead screw 58 controls the movement of cross-slide 57. The lower surface 59 on cross-slide 57 of head 53 supports working surface 4 as shown in Figure 1.

The method employed in locating working surfaces on jigs or fixtures, using the positioning tool hereinbefore described, is as follows. Hollow shells such as cup 5 are secured to the jig or fixture frame in their approximate locations as dictated by specific design requirements. After securing the cups to the frame, such as by welding, positioning tool 1 is clamped to the jig or fixture frame adjacent a cup. Then a working surface of the proper type for that location, such as working surface 4, is clamped to lower surface 59 on positioning tool 1. By manipulation of cross-head 9, working surface 4 is aligned to the approximate position over cup 5 with projection 6, a part of working surface 4, extending into cup 5. The final positioning of working surface 4 is accomplished by adjusting swivel element 11 and cross-slides 55 and 57. The correct position being determined by design for a particular application, and checked by ordinary leveling devices commonly used for that purpose. After the working surface is properly aligned in the desired plane, a hardening matrix, such as Wood's metal or any low melting point alloy is poured into cup 5, around extension 6 and allowed to harden. Working surface 4 is then detached from lower surface 59 of cross-slide 57 and the positioning tool is removed from the jig or fixture frame and attached thereto adjacent another cup for positioning another working surface. The independently controlled adjustments on positioning tool 1 permit fast and positive movement in any direction for locating the working surface in the desired plane in a minimum of time.

This method of attaching working surfaces to jigs and fixtures is a great improvement over the old method. Cup 5 being of a larger diameter than is extension 6, the working surface is allowed a certain degree of movement for aligning. Therefore the cup may be attached to the jig or fixture in the approximate location, leaving the accuracy of the setting operation to the positioning tool. The hardening matrix, when poured into the cup, will flow around extension 6 and when set, will hold it rigidly in the desired position. The old method employed direct connection between the extension and the jig or fixture. As a result, each working surface had to be specially adapted for the particular position and location, by machining.

The term working surface as used in the specification and in the claims is intended to include any fitting attached to a jig or fixture for the purpose of aligning or supporting another structure.

It is to be understood that certain changes, alterations, modifications and substitutions can be made without departing from the spirit and scope of the appended claims.

I claim as my invention:

1. A positioning tool for locating working surfaces on a jig or fixture comprising a main support, a clamping means carried on said support adjacent one end thereof for attaching said tool to said jig or fixture, a cross-head slidably carried by said main support and being rotationally and axially movable thereon, an arm slidably carried by said cross-head and being rotationally and axially movable relative thereto, clamping means carried by said cross-head for independently controlling said movements, a universal swivel element carried by said arm for universal movement, clamping means acting between said arm and said swivel element for controlling said movement, a post carried by said swivel, said post being axially and rotationally movable therein, clamping means carried by said swivel for controlling the rotational movement of said post, means acting between said swivel and said post for continuously controlling the axial movement of said post, a head carried by said post and including a locator, and means mounting said locator for movement on said head in all directions within a given plane transversely of the axis of said post, and screw means for continuously controlling said locator movement.

2. A positioning tool for locating working surfaces on a jig or fixture comprising a main support, a clamping means formed adjacent one end thereof for attaching said tool to said jig or fixture, a cross-head carried by said main support, said cross-head including an inner sleeve and an outer sleeve in fixed axial position with respect to one another, said cross-head being axially movable with respect to said support, clamping means on said inner sleeve for gripping said support when tightened, thus preventing said axial movement, said outer sleeve being rotationally movable with respect to said inner sleeve, clamping means on said outer sleeve for gripping said inner sleeve when tightened thus preventing said rotational movement, a collar formed integral with said outer sleeve and having a bore extending therethrough, a sleeve within said bore, said sleeve being rotationally movable therein, an arm extending through said bore and sleeve, said arm being axially and rotationally movable relative to said collar but being constrained against rotational movement relative to said sleeve, clamping means on said collar for gripping said arm when tightened thus preventing axial movement thereof, and means on said collar for gripping said sleeve when tightened thus preventing rotational movement thereof, a universal swivel element carried by said arm, said swivel element having an aperture formed therein, a sleeve extending into said aperture, and having threaded engagement with the walls thereof, said sleeve being axially movable by rotation thereof, a post extending into said aperture and engaging said sleeve, said post being fixed against axial movement relative to said sleeve but free to rotate with respect to said sleeve, means associated with said swivel and engaging said post for controlling the rotational movement of the post, a first track formed on said post adjacent one end and extending transversely thereof, a first cross-slide mounted on said track for substantially radial movement thereon with respect to the axis of said post, and a second track formed on said first mentioned cross-slide and extending radially of said post and substantially perpendicular to said first track, and a second cross-slide slidably mounted on said second track, and means to retain each of said cross slides in engagement with its track during sliding movement thereon.

3. In a device of the class described having a main support, a cross-head carried by said main support, said cross-head including an inner sleeve axially slidable on said main support and an outer sleeve rotatable on the inner sleeve and in fixed axial position with respect to the inner sleeve, clamping means on said inner sleeve for gripping said support when tightened, thus preventing said axial movement, clamping means on said outer sleeve for gripping said inner sleeve when tightened thus preventing said rotational movement, a collar formed integral with said outer sleeve and having walls forming an aperture, a third sleeve rotatably supported within said collar aperture, an arm extending through and slidably supported in said aperture and said third sleeve, said arm being axially and rotationally movable relative to said collar, means constraining said arm against rotational movement relative to said third sleeve, clamping means on said collar for gripping said arm when tightened thus preventing axial movement thereof, and means on said collar for gripping said sleeve when tightened thus preventing rotational movement thereof.

4. In a device of the class described, a swivel ring, a universal swivel element carried by said swivel ring for universal movement with respect thereto, clamping means carried by said swivel ring controlling the universal movement of said swivel element, said swivel element having an aperture formed therein, a sleeve extending into said aperture and having threaded engagement with the walls thereof, said sleeve being axially movable by rotation thereof, a post extending into said aperture and engaging said sleeve, said post being fixed against axial movement but free to rotate with respect to said sleeve, means associated with said swivel and engaging said post for controlling the rotational movement of the post, a first track formed on said post adjacent one end and extending transversely thereof, a first cross-slide mounted on said track for substantially radial movement thereon with respect to the axis of said post, and a second track formed on said first mentioned cross-slide and extending radially of said post and substantially perpendicular to said first track, and a second cross-slide slidably mounted on said second track, and means to retain each of said cross-slides in engagement with its track during sliding movement thereon.

5. A positioning tool for locating working surfaces on a jig or fixture comprising a main support, a clamping means carried on said support adjacent one end thereof for attaching said tool to said jig or fixture, a cross-head slidably carried by said main support and being rotationally and axially movable thereon, an arm slidably carried by said cross-head and being rotationally and axially movable relative thereto, clamping means acting between said support and said cross-head and between said cross-head and said arm for controlling said movements, a universal swivel element carried by said arm for universal movement, clamping means acting between said arm and said swivel for controlling said movement, a post carried by said swivel, said post being axially and rotationally movable therein, clamping means carried by said swivel for controlling the rotational movement of said post, means acting between said swivel and said post for continuously controlling the axial movement of said post, a head carried by said post and including a locator, and means mounting said locator for movement on said head in all directions within a given plane transversely of the axis of said post, and screw means acting between said head and said locator for continuously controlling said movement.

6. A positioning tool for locating working surfaces on a jig or fixture comprising a main support, an arm supported by said main support so as to be independently movable both axially and rotationally with respect to said main support, a swivel element carried by said arm and being capable of universal movement, said element having an aperture formed therein, a threaded member located in said aperture and threadedly engaging said swivel element, said member upon being rotated being moved longitudinally along said aperture because of said threaded engagement, a locating member, means on said threaded member supporting said locating member for bodily adjustment relative to said element both parallel to and perpendicular to said aperture.

References Cited in the file of this patent

UNITED STATES PATENTS

| | | |
|---|---|---|
| 432,829 | Hirst | July 22, 1890 |
| 1,192,267 | Bond | July 25, 1916 |
| 1,313,061 | Brown | Aug. 12, 1919 |
| 1,386,318 | Cowan | Aug. 2, 1921 |
| 1,625,075 | Clement | Apr. 19, 1927 |
| 1,670,253 | Gilbert | May 5, 1928 |
| 1,882,755 | Boynton | Oct. 18, 1932 |
| 1,902,376 | Purdin | Mar. 21, 1933 |
| 1,952,945 | Sawada | Mar. 27, 1934 |
| 2,019,789 | Mahannah | Nov. 5, 1935 |
| 2,255,630 | Sass | Sept. 9, 1941 |
| 2,271,194 | Ingwer | Jan. 27, 1942 |
| 2,390,596 | Larsen | Dec. 11, 1945 |
| 2,468,358 | Clark | Apr. 26, 1949 |